Oct. 12, 1965    TOMOKICHI TANGO ETAL    3,211,992
THREE-PHASE VOLTAGE REGULATORS EMPLOYING A SATURABLE
REACTOR AND CONDENSER IN EACH PHASE
Filed Feb. 27, 1962

INVENTOR.
Tomokichi Tango
Hiroshi Kobayashi
BY Takeshi Anayama
Eijiro Miyazawa

United States Patent Office 3,211,992
Patented Oct. 12, 1965

3,211,992
THREE-PHASE VOLTAGE REGULATORS EMPLOYING A SATURABLE REACTOR AND CONDENSER IN EACH PHASE
Tomokichi Tango, Fujisawa, and Hiroshi Kobayashi, Kawasaki, Kanagawa, and Takeshi Anayama, Sendai, Miyagi, and Eijiro Miyazawa, Mitaka, Tokyo, Japan, assignors, by direct and mesne assignments, to Yawata Iron & Steel Co., Ltd., Tokyo, Japan, a corporation of Japan
Filed Feb. 27, 1962, Ser. No. 176,073
Claims priority, application Japan, Mar. 10, 1961, 37/48,125
1 Claim. (Cl. 323—89)

This invention relates to a three-phase constant voltage regulator. More particularly the present invention relates to a series resonance type three-phase constant voltage regulator which resonates at the frequency of the supply voltage.

A main object of the present invention is to provide a series resonance type three-phase constant voltage regulator having high efficiency and quick response, which supplys a well balanced three-phase constant voltage with good sinusoidal wave form at the supply frequency, and which has a simple construction.

The features and advantages of the present invention will be made clear by the following description with reference to the accompanying drawings wherein.

Figure 1:
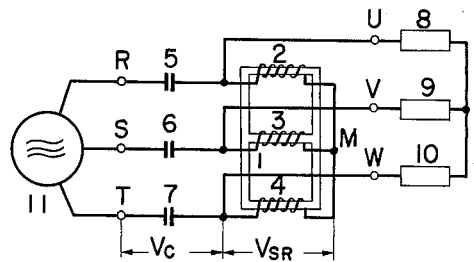
FIGURE 1 is a circuit diagram of an embodiment of the present invention.

In FIGURE 1, 1 is a three-leg type core, 2, 3 and 4 are R, S and T phase saturable reactors, respectively, 5, 6 and 7 are series resonance condensers connected with the respective reactors 2, 3 and 4, 8, 9 and 10 are loads of the respective phases and 11 is a three-phase alternating current voltage source. Terminals R, S and T are provided to connect the regulator to a voltage source 11, and U, V and W are the terminals for loads 8, 9 and 10 respectively.

Each of the condensers 5, 6 and 7 is connected at one end to a corresponding terminal for the three-phase voltage source, and at another ends is connected to one end of a respective one of the three windings of the three saturable reactors 2, 3 and 4. Each connection between a condenser and a reactor is connected to a respective one of the terminals U, V and W for loads 8, 9 and 10. The three saturable reactors 2, 3 and 4 together form a three-phase saturable reactor which has a three-leg type magnetic core 1. The windings of the reactors 2, 3 and 4 are wound on the respective legs of the three-leg type magnetic core 1. The other ends of windings of 2, 3 and 4 are star connected at a point M. Each series circuit of a condenser and a winding of the three-phase saturable reactor, i.e. condenser 5 and reactor 2, condenser 6 and reactor 3, and condenser 7 and reactor 4, is constructed so as to resonate at the fundamental frequency of the supplied voltage.

Figure 2:
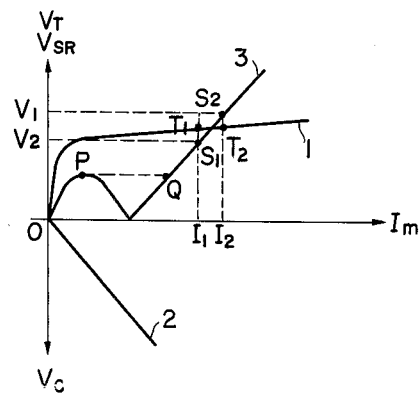
FIGURE 2 is a graph explaining the operating principle of the embodiment shown in FIGURE 1.

Now, when the loads 8, 9 and 10 are not connected to output points U, V and W, respectively, since one end of each saturable reactor is star-connected at a point M, the exciting current $I_m$ which flows through each of the saturable reactors 2, 3 and 4 will contain no third harmonic component and will therefore have a substantially sinusoidal wave form and the relation between the reactor voltage $V_{sR}$ of each phase and the exciting current $I_m$ will be as represented by the curve 1 in FIGURE 2. Further, since the current through the condensers 5, 6 and 7 is equal to the exciting current, it will be $I_m$ and therefore the relation of the terminal voltage $V_c$ of the condenser to the current $I_m$ will be the straight line 2 in FIGURE 2. The curve 1 is shown on the upper side and the straight line 2 is shown on the lower side because the voltage $V_{sR}$ is leading the current $I_m$ by 90° and the voltage $V_c$ is lagging the current $I_m$ by 90°. Therefore, if the curve 1 and the straight line 2 are added together, the curve 3 will be obtained and will have an absolute value shown by $V_t$. Since the algebraic sum of the voltages $V_{sR}$ and $V_c$ is always equal to the phase voltage of the voltage source 11, when the value of the phase voltage of the voltage source is $V_1$, the value of current $I_m$ corresponding to it will be $I_1$ as shown in FIGURE 2 and the value of voltage $V_{sR}$ corresponding to it becomes the value corresponding to the point $T_1$. When the phase voltage of the source voltage rises to $V_2$, the current increase to $I_2$ and the voltage $V_{sR}$ corresponding to it will rise to the value corresponding to the point $T_2$. Thus, when the phase voltage of the source voltage varies from $V_1$ to $V_2$, the variation of $V_{sR}$ will be small. Thus, the phase voltages at terminals U, V and W will be nearly constant and equal even under the condition of large variation in source voltage.

Under load conditions, if the power factors of the loads 8, 9 and 10 are nearly equal to unity, the phase of the current supplied from voltage source to the load differs by about 90° from the phase of the said exciting current $I_m$. Hence, the phase of the voltage drop on the condenser caused voltage drop caused by the exciting current $I_m$, which is in phase with the phase voltage of the voltage source. Since the full load current and $I_m$ do not differ much in their magnitude, the resulting terminal voltage for the load does not change very much because of the load current. Thus, the phase voltages at terminals U, V and W are kept nearly constant and equal even under load conditions.

Figure 3:
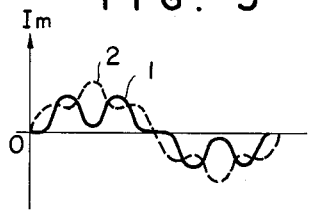
FIGURE 3 is a graph showing the wave form of the exciting current of three-phase saturable reactors.

Making the core 1 a three-leg type serves to improve the wave form of the exciting current. That is to say, if the respective cores of the reactors 2, 3 and 4 are three separate cores, the half wave of the exciting current $I_m$ will be formed of two peaks as shown by the curve 1 in FIGURE 3. If the core is of a three-leg construction, the half wave will be formed of three peaks of which the middle one is the highest as shown by the curve 2 in FIGURE 3. Therefore, if the leakage flux is large in the core 1 in FIGURE 1, the wave form of the exciting current of each phase reactor will be a combination of the wave forms 1 and 2 in FIGURE 3 and will be substantially sinusoidal.

Further, when the core 1 has a three-leg construction, the balance of the three phases will be easy to maintain.

One particular embodiment of the new and improved three-phase voltage regulator in accordance with the invention having been described, it is believed obvious that other modifications and variations of the invention are possible in the light of the above teachings. It is therefore to be understood that changes may be made in the described particular embodiment of the invention within the full intended scope of the invention as defined by the appended claim.

What we claim is:

1. A series resonance type three-phase constant voltage regulator for supplying constant output voltage, consisting essentially of three condensers each adapted to have one side coupled only to one phase of a three-phase voltage source, three saturable reactors each having a winding and a core with the cores being connected to each other in three legged core, respective windings each having one end connected to the other side of a respective one of said condensers for forming three series connected sets each consisting of a condenser and a saturable reactor and resonating at frequency of the source voltage, each winding of the saturable reactors being saturable by the phase voltage of the voltage source, the other ends of the saturable reactor windings being star connected so as to supply the high frequency voltage induced in the saturable reactor windings, and three output terminals connected to points between the condensers and the saturable reactor windings, respectively.

References Cited by the Examiner

UNITED STATES PATENTS

| | | | |
|---|---|---|---|
| 1,527,646 | 2/25 | Hansell | 323—76 X |
| 2,232,257 | 2/41 | Myles | 323—76 X |
| 2,333,211 | 11/43 | Stevens | 323—76 X |
| 2,380,522 | 7/45 | Hanz | 323—76 X |
| 2,598,437 | 5/52 | Bedford | 323—124 |
| 3,040,230 | 6/62 | Biringer (II) | 323—76 |
| 3,040,231 | 6/62 | Biringer | 323—76 X |

LLOYD McCOLLUM, *Primary Examiner.*